(12) United States Patent
Polyntsev

(10) Patent No.: US 9,435,157 B2
(45) Date of Patent: *Sep. 6, 2016

(54) BOTTOM HOLE ASSEMBLY INCLUDING BI-STABLE VALVES

(71) Applicant: Schlumberger Technology Corporation, Sugar Land, TX (US)

(72) Inventor: Oleg Polyntsev, Cheltenham (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 323 days.

This patent is subject to a terminal disclaimer.

(21) Appl. No.: 14/085,629

(22) Filed: Nov. 20, 2013

(65) Prior Publication Data

US 2014/0076637 A1    Mar. 20, 2014

Related U.S. Application Data

(63) Continuation of application No. 12/955,507, filed on Nov. 29, 2010, now Pat. No. 8,602,104.

(51) Int. Cl.
```
E21B 7/06      (2006.01)
F16K 11/044    (2006.01)
E21B 34/06     (2006.01)
```
(52) U.S. Cl.
CPC .............. *E21B 7/06* (2013.01); *E21B 7/062* (2013.01); *E21B 34/06* (2013.01); *F16K 11/044* (2013.01)

(58) Field of Classification Search
CPC .................................. E21B 7/06; E21B 34/06
See application file for complete search history.

(56) References Cited

U.S. PATENT DOCUMENTS

| | | | | |
|---|---|---|---|---|
| 3,198,088 A | * | 8/1965 | Johnson | B62D 5/09 137/630.15 |
| 8,602,104 B2 | * | 12/2013 | Polyntsev | E21B 7/062 166/316 |
| 2003/0127252 A1 | * | 7/2003 | Downton | E21B 7/068 175/73 |
| 2012/0132428 A1 | | 5/2012 | Polyntsev | |

* cited by examiner

*Primary Examiner* — David Andrews

(57) ABSTRACT

A bi-stable valve includes a first chamber having a first aperture and a second aperture, and a second chamber having a first aperture and a second aperture. The bi-stable valve also includes a shaft having a first valve member adjacent a first end of the shaft and a second valve member adjacent an opposite second end of the shaft. The shaft is movable between a first position, in which the first valve member closes off the second aperture of the first chamber and the second valve member closes off the second aperture of the second chamber to prevent fluid from passing through the second apertures of the first and second chambers, and a second position, in which the first valve member and the second valve member allow fluid to pass through the second aperture of the first chamber and the second aperture of the second chamber.

18 Claims, 8 Drawing Sheets

BOTTOM HOLE ASSEMBLY INCLUDING BI-STABLE VALVES

This application is a continuation application of U.S. patent application Ser. No. 12/955,507, filed Nov. 29, 2010.

BACKGROUND

In the drilling of oil and gas wells, a drill bit is typically located at the end of a drill string. Rotation of the drill string causes the drill bit to drill into the well. It may be necessary in certain situations to deviate from drilling the well in a vertical direction. This is referred to as directional drilling. A known method of directional drilling includes the use of a rotary steerable system. In such systems, down hole devices steer the drill bit in a desired direction.

The rotary steerable system can include a bias unit that is located adjacent to the drill bit. The bias unit applies force to the drill bit in a controlled direction while the drill string rotates. The bias unit includes a plurality of bias pads that are actuated by drilling fluid or mud through a valve. The valve actuates the bias pads by sequentially diverting the drilling fluid into the piston chamber of each pad. Each bias pad is movable between a retracted position and an extended position in which the bias pad is positioned against the wall of the well. The drill bit can be urged in a desired direction by controlling the movement of the bias pads.

The manufacture and maintenance of conventional valves may be complex. Conventional valves generally limit the rotational speed of the drill bit to a maximum rotational speed of 200 RPM due in part to limited backflow capability of conventional valves.

SUMMARY

In one exemplary embodiment, a bi-stable valve includes a first chamber having a first aperture and a second aperture, and a second chamber having a first aperture and a second aperture. The bi-stable valve also includes a shaft having a first valve member adjacent a first end of the shaft and a second valve member adjacent an opposite second end of the shaft. The shaft is movable between a first position (a closed position), in which the first valve member closes off the second aperture of the first chamber and the second valve member closes off the second aperture of the second chamber to prevent fluid from passing through the second apertures of the first and second chambers, and a second position (an open position), in which the first valve member and the second valve member allow fluid to pass through the second aperture of the first chamber and the second aperture of the second chamber. A bi-stable actuator can be provided to control the movement of the shaft.

In another exemplary embodiment, a downhole tool control system includes a plurality of bi-stable valves, each of which includes the features described above. The control system includes a common inlet conduit in fluid communication with the first aperture of the first chamber and the first aperture of the second chamber of each of the bi-stable valves.

A downhole bi-stable valve is provided in another exemplary embodiment. The downhole bi-stable valve includes a first state in which an exhaust port and a pad port are exposed to a first pressure and an inlet port is exposed to a second pressure greater than the first pressure, and a second state in which the exhaust port, the pad port, and the inlet port are exposed to the second pressure. The valve is pressure balanced in both the first state and the second state.

BRIEF DESCRIPTION OF THE DRAWINGS

The foregoing and other objects, aspects, features, and advantages of exemplary embodiments will become more apparent and may be better understood by referring to the following description taken in conjunction with the accompanying drawings, in which.

DETAILED DESCRIPTION

The exemplary embodiments taught herein are described in connection with a pressure balanced single stage bi-stable valve that is used in a downhole tool control system. It should be understood, however, that the teachings herein can be used with other types of valves.

Figure 1:
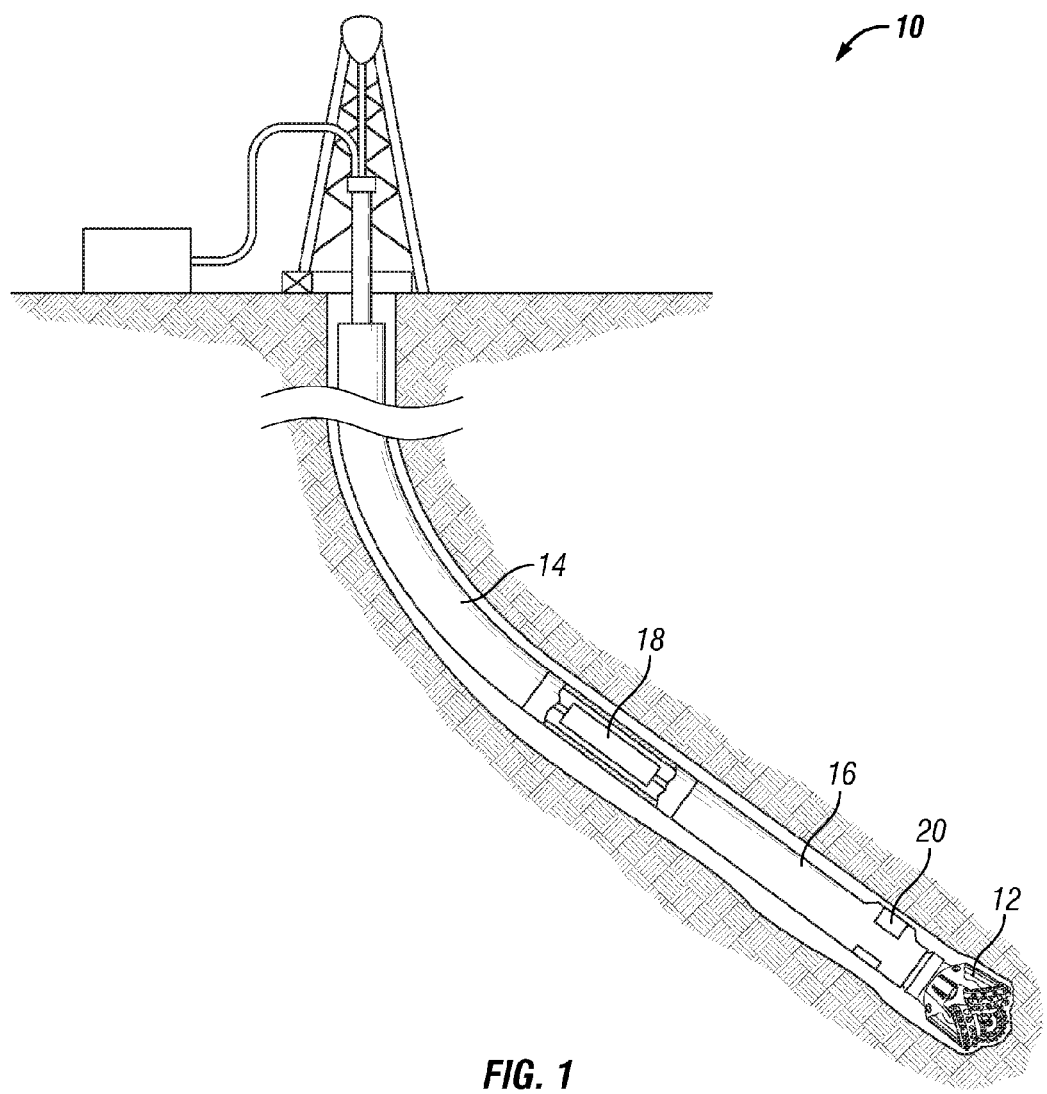
FIG. 1 is a schematic view of a drilling installation that shows an exemplary bottom hole assembly.

In order to fully understand the advantages of the bi-stable valve, a brief overview of a bottom hole assembly 10 is provided in FIG. 1. The bottom hole assembly 10 may include a drill bit 12 which is connected to a lower end of a drill string 14. A bias unit 16 is connected to the drill bit 12 and a control unit 18 is provided to control the operation of the bias unit 16. The bias unit 16 may be controlled to apply a lateral bias to the drill bit 12 in a desired direction to control the direction of drilling.

The bias unit 16 includes a plurality of pads 20 movable between extended and retracted positions. Each of the pads 20 is supplied with drilling fluid or mud under pressure through a bi-stable valve (not shown in FIG. 1). The bi-stable valve actuates the pads 20 by sequentially diverting the drilling fluid into chambers formed in each pad 20.

Figure 2:
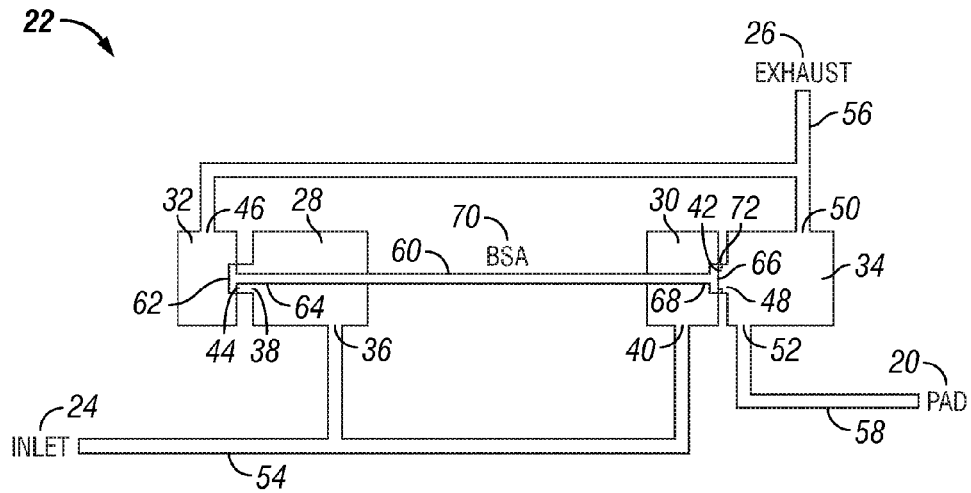
FIG. 2 is a schematic view of an exemplary single stage pressure balanced bi-stable valve.
Figure 3:
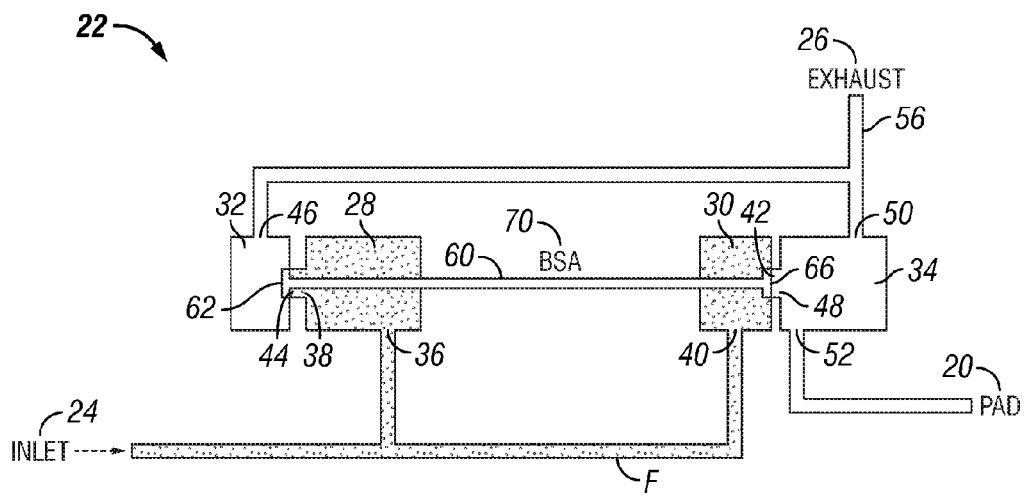
FIG. 3 is a schematic view similar to the view shown in FIG. 2, where the bi-stable valve is in a closed position.
Figure 4:
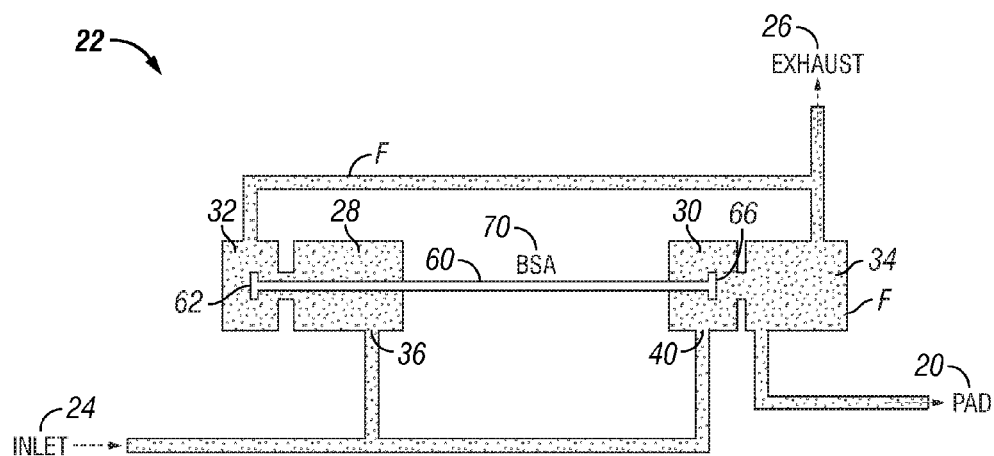
FIG. 4 is a schematic view similar to the view shown in FIG. 2, where the bi-stable valve is in an open position.

FIGS. 2-4 illustrate an exemplary embodiment of a pressure balanced single stage bi-stable valve 22 of the present invention. The valve, designated generally as 22, is adapted to regulate the flow of a drilling fluid or mud to a pad, such as one of the pads 20 (see FIG. 1). Drilling fluid is delivered to the valve 22 through an inlet 24 and is discharged from the valve 22 through an exhaust 26.

Referring to FIGS. 2-4, the valve 22 is equipped with a first chamber 28, a pad inlet chamber 30 (a second chamber 30), a pressure balancing chamber 32 (a third chamber 32), and a fourth chamber 34 in one exemplary embodiment. The first chamber 28 is located adjacent to the third chamber 32, while the second chamber 30 is located adjacent to the fourth chamber 34. While four chambers are shown, it will be understood that the labeling and sizing of the chambers can vary.

The first chamber 28 includes a first aperture 36 and a second aperture 38, and the second chamber 30 includes a first aperture 40 and a second aperture 42. The third chamber 32 includes a first aperture 44 and a second aperture 46, and the fourth chamber 34 includes a first aperture 48, a second aperture 50, and a third aperture 52. The second aperture 38 of the first chamber 28 is in fluid communication with the first aperture 44 of the third chamber 32. Also, the second aperture 42 of the second chamber 30 is in fluid communication with the first aperture 48 of the fourth chamber 34. It will be understood that the number of apertures in each chamber can vary. In some embodiments, there can only be a single aperture between the first chamber 28 and the third chamber 32, and there can only be a single aperture between the second chamber 30 and the fourth chamber 34.

The diameters of the apertures formed in the chambers 28, 30, 32, 34 can be different from each other. For example, in one exemplary embodiment, the diameter of the second aperture 38 of the first chamber 28 is greater than the diameter of the second aperture 42 of the second chamber 30.

An inlet conduit 54 extends between the inlet 24, the first chamber 28, and the third chamber 32. The inlet conduit 54 is in fluid communication with the first aperture 36 of the first chamber 28 and the first aperture 40 of the second chamber 30.

An exhaust conduit 56 extends between the exhaust 26, the third chamber 32, and the fourth chamber 34. The exhaust conduit 56 is in fluid communication between the second aperture 46 of the third chamber 32 and the second aperture 50 of the fourth chamber 34.

A pad conduit 58 extends from the fourth chamber 34 to the pad 20. The pad conduit 58 is in fluid communication with the third aperture 42 of the fourth chamber 34.

The valve 22 includes a shaft 60 having a first valve member 62 adjacent a first end 64 of the shaft 60, and a second valve member 66 adjacent an opposite second end 68 of the shaft 60. The first valve member 62 of the shaft 60 is located adjacent to the first chamber 28, and the second valve member 66 of the shaft 60 is located adjacent to the second chamber 30.

A bi-stable actuator 70 (shown schematically as "BSA" in the figures) is provided to move the shaft 60 between a first closed position (a first state) as shown in FIG. 2 and a second open position (a second state) as shown in FIG. 3. In the closed position (see FIG. 2), the first valve member 62 is adjacent to the second aperture 38 of the first chamber 28 and closes off the second aperture 38 of the first chamber 28 to prevent fluid from passing to the third chamber 32. The second valve member 66 is positioned adjacent to the second aperture 42 of the second chamber 30 and closes off the second aperture 42 of the second chamber 30 to prevent fluid from passing to the fourth chamber 34. In this manner, the first chamber 28 is fluidly isolated from the third chamber 32, and the second chamber 30 is fluidly isolated from the fourth chamber 34.

When the actuator 70 moves the shaft 60 to the open position (see FIG. 3), the shaft 60 extends into the third chamber 32. This causes the first valve member 62 to move away from the second aperture 38 of the first chamber 28 to thereby allow fluid to pass through the second aperture 38 of the first chamber 28 to the third chamber 32. This also causes the second valve member 66 to move away from the second aperture 42 of the second chamber 30 to thereby allow fluid to pass through the second aperture 42 of the second chamber 30 to the fourth chamber 34. In this manner, the first chamber 28, the second chamber 30, the third chamber 32, the fourth chamber 34, the pad conduit 58, and the exhaust conduit 56 are fluidly coupled to each other so as to allow the flow of fluid therethrough, thereby charging the pad 20.

In one exemplary embodiment, a restrictor 72 is provided to restrict the shaft 60 from extending into the fourth chamber 34. In another exemplary embodiment, the shaft 60 can be prevented from extending into the fourth chamber 34 or moving further into the third chamber 32 by internal restrictors of the actuator 70, which is dictated by the efficiency of the circuitry of the actuator 70.

In operation, the valve 22 may initially be in the closed position (see FIGS. 2 and 3), although it can be in the open position as well. Drilling fluid F is delivered under pressure through the inlet 24. The drilling fluid then flows through the inlet conduit 54. A portion of the drilling fluid F flows to the first chamber 28, while the other portion of the drilling fluid F flows to the third chamber 32. Because the first valve member 62 closes off the second aperture 38 of the first chamber 28, fluid F is prevented from passing through the second aperture 38 of the first chamber 28 and remains in the first chamber 28. Likewise, because the second valve member 66 closes off the second aperture 42 of the second chamber 30, fluid F is prevented from passing through the second aperture 42 of the second chamber 30 and remains in the second chamber 30. This prevents fluid F from flowing to the pad conduit 58 and to the exhaust conduit 56.

The first and second chambers 28, 30 and the inlet conduit 54 are exposed to a high hydrostatic pressure when the valve 22 is in the closed state. This is because flow of fluid is restricted to the first and second chambers 28, 30 and the inlet conduit 54. The hydrostatic pressure acting in a first direction against the first valve member 62 is substantially balanced by hydrostatic pressure acting in an opposite direction against the second valve member 66. Because of the lack of pressure differential, the valve 22 is pressure-balanced when the shaft 60 is in the closed position. In one exemplary embodiment, the maximum hydrostatic pressure can be 850 PSI, and the differential pressure can be in a range from 450 PSI to 850 PSI. Those skilled in the art would appreciate that because the valve 22 is pressure-balanced, as such the maximum pressure differential is limited by the structural strength of the valve parts under tension, which, in turn depends on the selection of materials and the sizes of the valve components.

It should be noted that the force required by the actuator 70 to move the shaft 60 is proportional to the differential pressure. Because the valve 22 is pressure-balanced, the actuator 70 requires less force to move the shaft 60 compared to prior art valves where the valve is not pressure-balanced.

Turning now to FIG. 4, the shaft 60 is moved to the open position by the actuator 70. In particular, the first valve member 62 moves away from the second aperture 38 of the first chamber 28 to thereby allow fluid F to pass through the second aperture 38 of the first chamber 28 to the third chamber 32. The second valve member 66 moves away from the second aperture 42 of the second chamber 30 to thereby allow fluid F to pass through the second aperture 42 of the second chamber 30 to the fourth chamber 34. After passing through the third chamber 32 and the fourth chamber 34, fluid F flows through the exhaust conduit 56 to the exhaust and through the pad conduit 58 to the pad 20.

The pad conduit 58, the exhaust conduit 56, the inlet conduit 54, and the chambers 28, 30, 32, 34 are exposed to high hydrostatic pressure when the valve 22 is in the open position. This is because fluid F flows through the pad conduit 58, the exhaust conduit 56, the inlet conduit 54, and the chambers 28, 30, 32, 34. Because of the lack of pressure differential, the valve 22 is pressure-balanced when the shaft 60 is in the open position.

In one exemplary embodiment, the relative flow of fluid through the chambers 28, 30, 32, 34, the pad conduit 58, the exhaust conduit 56, and the inlet conduit 54 can be controlled. For example, an orifice of the pad conduit 58 can have a larger size than an orifice of the exhaust conduit 56 such that fluid flow through the pad conduit 58 is less restricted than fluid flow through the exhaust conduit 56.

Figure 5:
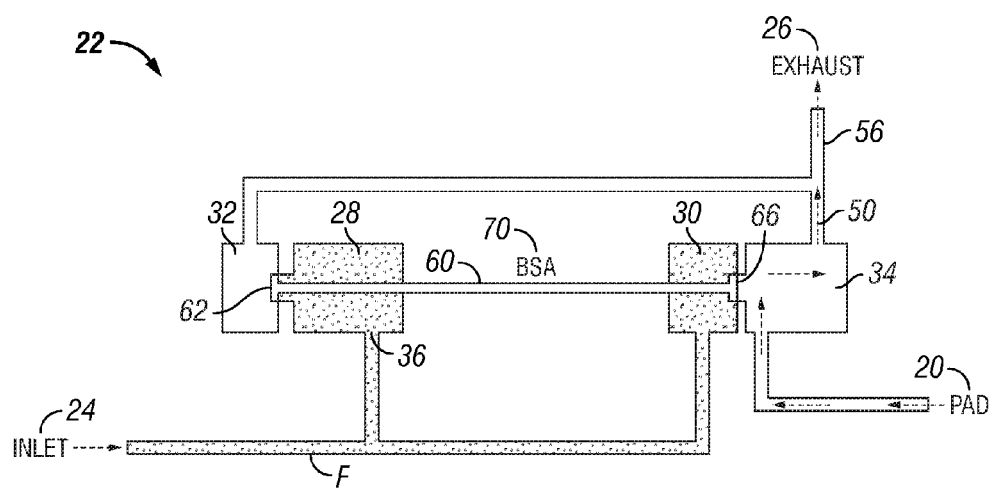
FIG. 5 is a schematic view similar to the view shown in FIG. 2, where a pad is being discharged when the bi-stable valve is in a closed position.

Referring to FIG. 5, the shaft 60 is moved from the open position to the closed position by the actuator 70 to discharge fluid F from the pad 20. Because the first valve member 62 closes off the second aperture 38 of the first chamber 28, fluid F from the inlet conduit 54 is prevented from passing through the second aperture 38 of the first chamber 28 and remains in the first chamber 28. Likewise, because the second valve member 66 closes off the second aperture 42 of the second chamber 30, fluid F from the inlet conduit 54 is prevented from passing through the second aperture 42 of the second chamber 30 and remains in the second chamber 30. This prevents additional fluid from flowing to the pad conduit 58 and to the exhaust conduit 56. The existing fluid in the pad 20 is discharged or exhausted through the pad conduit 58, the fourth chamber 34, and the exhaust conduit 56 to the exhaust 26.

The first and second chambers 28, 30 and the inlet conduit 54 are exposed to a high hydrostatic pressure when the valve 22 is in the closed state and the pad 20 is discharged. This is because high pressure flow of fluid is restricted to the first and second chambers 28, 30 and the inlet conduit 54. The pad conduit 58 and the exhaust conduit 56 are exposed to a low hydrostatic pressure because fluid F in the pad 20 is discharged through the pad conduit 58 and the exhaust conduit 56 and additional high pressure fluid is prevented from entering the pad conduit 58 and the exhaust conduit 56. Because of the lack of pressure differential, the valve 22 is pressure-balanced when the shaft 60 is in the closed position and the pad 20 is being discharged.

When the pad 20 is discharged, certain components of the valve 22, such as the third and fourth chambers 32, 34, the pad conduit 58, and the exhaust conduit 56, are not exposed to high pressure fluid flow. Thus, these components of the valve 22 are resistant to erosion.

The exemplary embodiments of the valve 22 allows a downhole tool to achieve a higher RPM than conventional prior art valves. That is, the exemplary embodiments of the valve 22 permits dumping due to backflow from a discharging pad line at high RPMs. In various exemplary embodiments, the RPM can be in a range of 600 RPM to 700 RPM. By contrast, conventional rotary valves are limited to a maximum RPM of between 180 and 220 RPMs. Those skilled in the art would appreciate that in other embodiments other RPMs greater than the conventional maximum limit are achievable depending on such factors, such as the distance between the valve 22 and the pad 20, internal restrictions in charging and discharging conduits, moment of inertia of the bias unit, etc.

Figure 6:
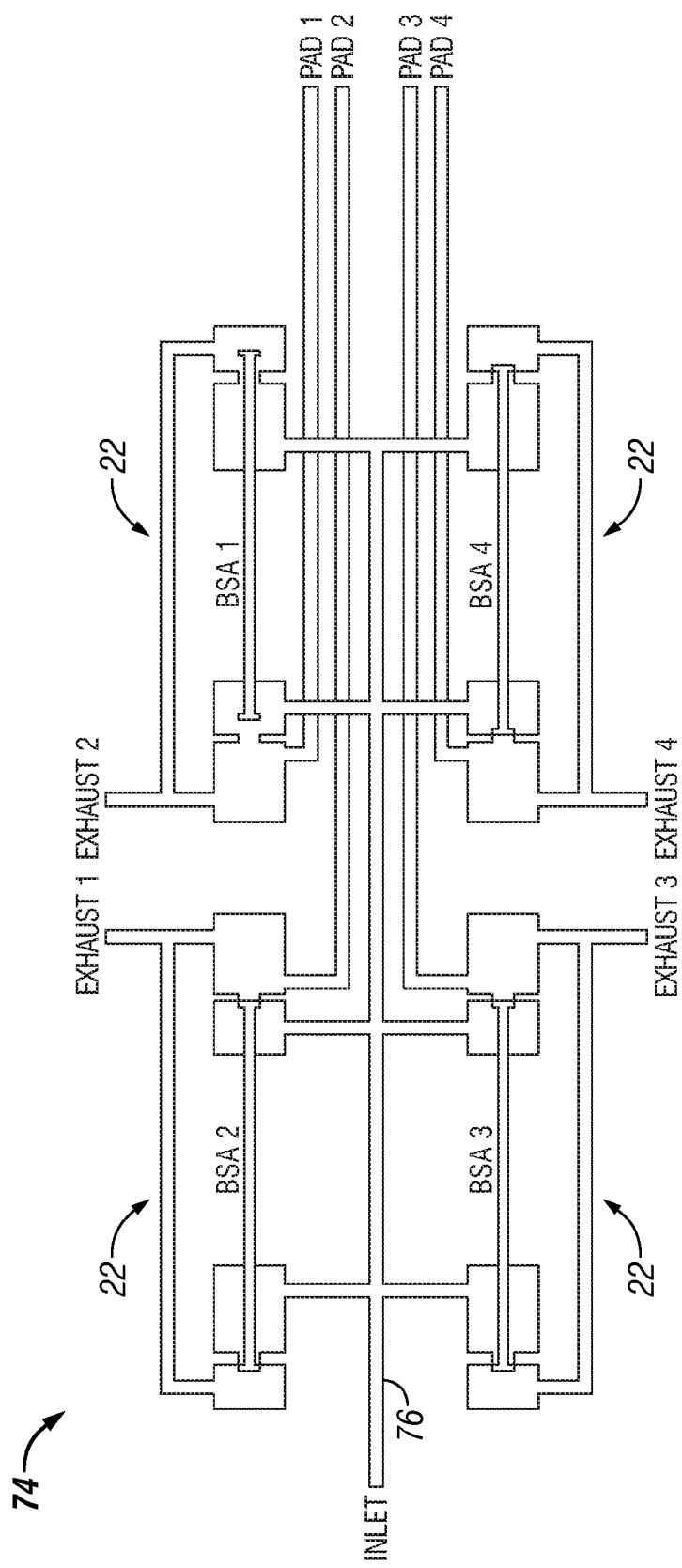
FIG. 6 is a schematic view of an exemplary down hole tool control system that includes a plurality of bi-stable valves.

FIG. 6 is a downhole tool control system 74 that includes a plurality of bi-stable valves 22A-D in an exemplary embodiment. In particular, the control system 74 includes a first valve 22A, a second valve 22B, a third valve 22C, and a fourth valve 22D. Each of the valves 22A-D cooperates with a respective pad 20 and a respective exhaust 26. While four valves are shown, it will be understood that the number and arrangement of the valves can vary.

The control system 74 includes a common inlet conduit 76 that is in fluid communication with the first aperture 36 of the first chamber 28 and the first aperture 40 of the second chamber 30 of each of the valves 22A-D. Each of the valves 22A-D is adapted to individually regulate the flow of fluid F to a separate pad 20. In particular, each pad conduit 58 of each valve 22A-D is in fluid communication with a respective one of the plurality of valves 22A-D to separately control a plurality of pads 20.

Fluid F is delivered to each valve 22A-D through the common inlet conduit 76 and is discharged from each valve 22A-D through a separate exhaust 26. In particular, each exhaust conduit 56 of each valve 22A-D is in fluid communication with a respective one of the plurality of valves 22 to provide separate exhausts 26 for each of the plurality of valves 22A-D.

Figure 7:
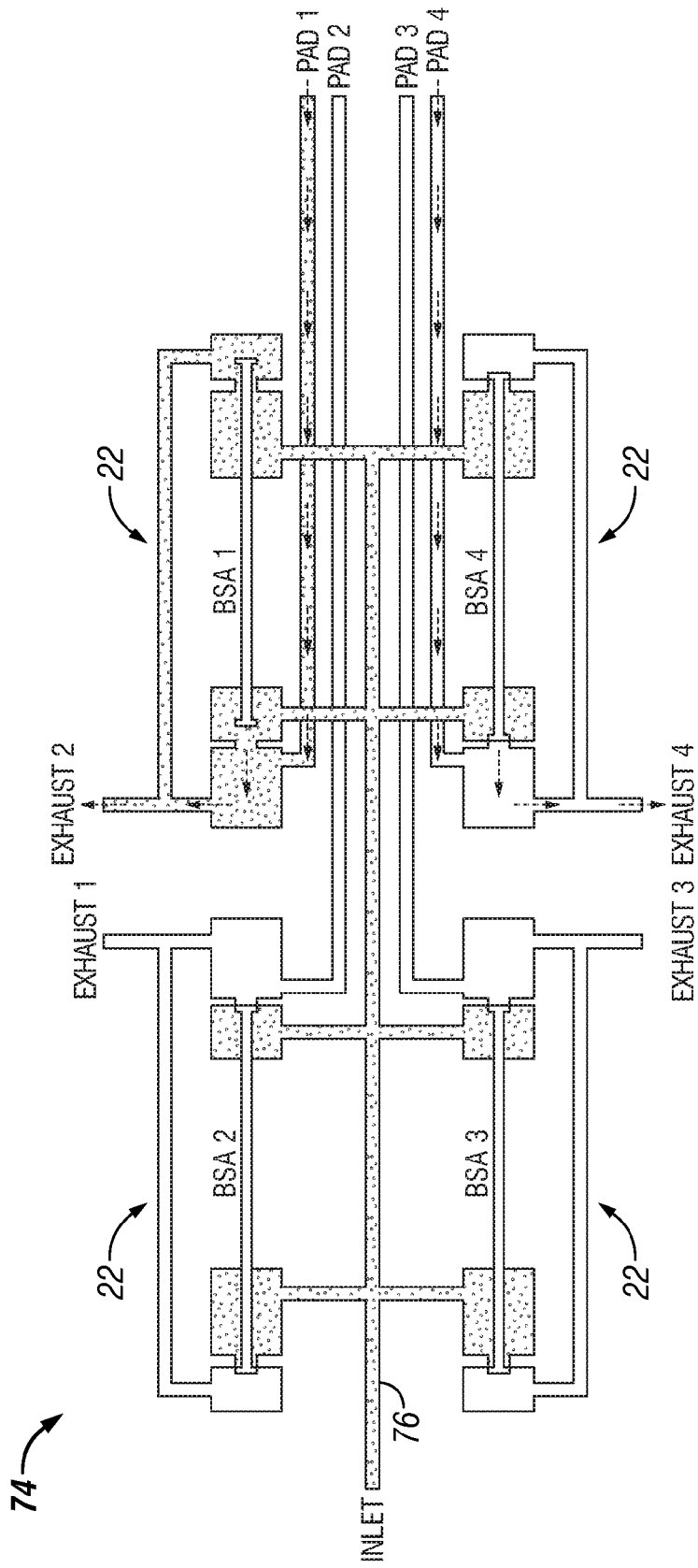
FIG. 7 is a schematic view similar to the view shown in FIG. 6, where one of the pads is being charged and another pad is being discharged.
Figure 8:
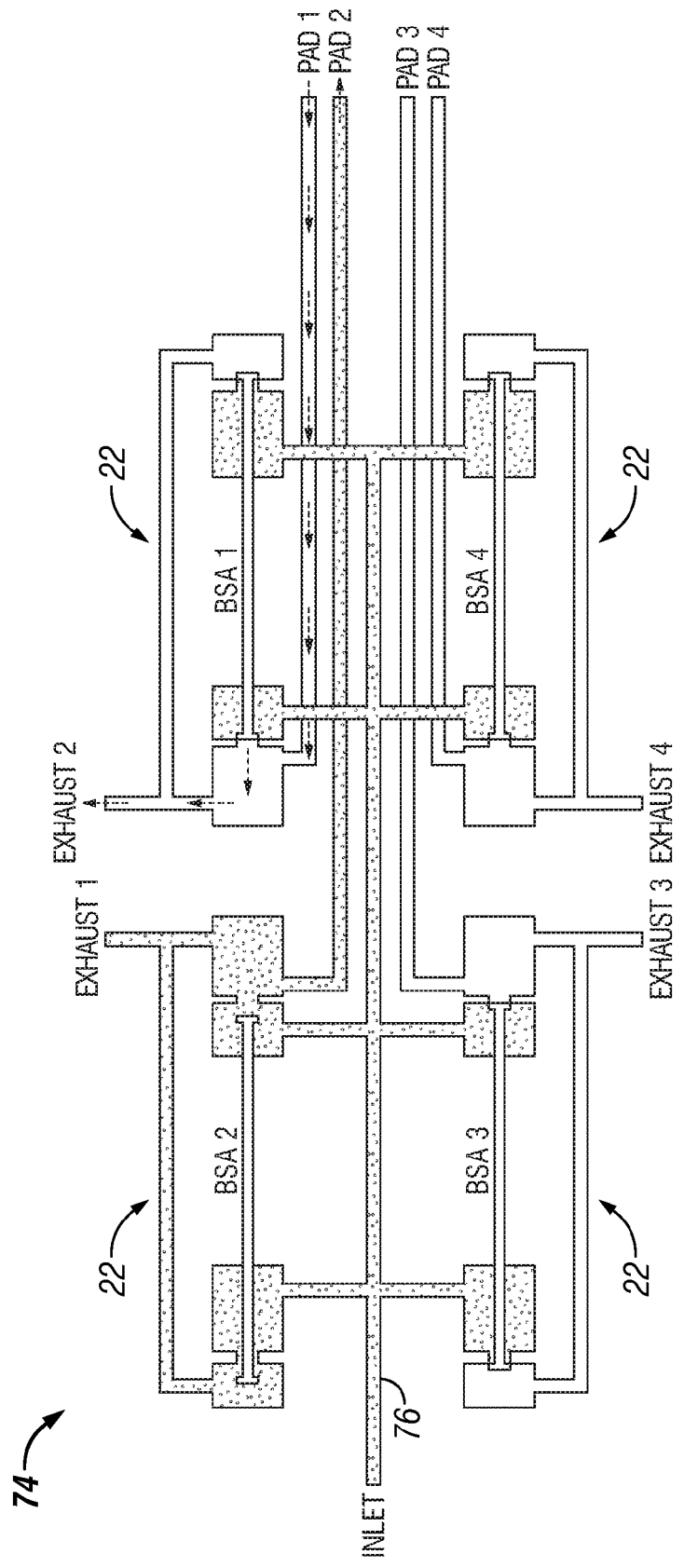
FIG. 8 is a schematic view similar to the view shown in FIG. 6, where one of the pads is being charged and another pad is being discharged.
Figure 9:
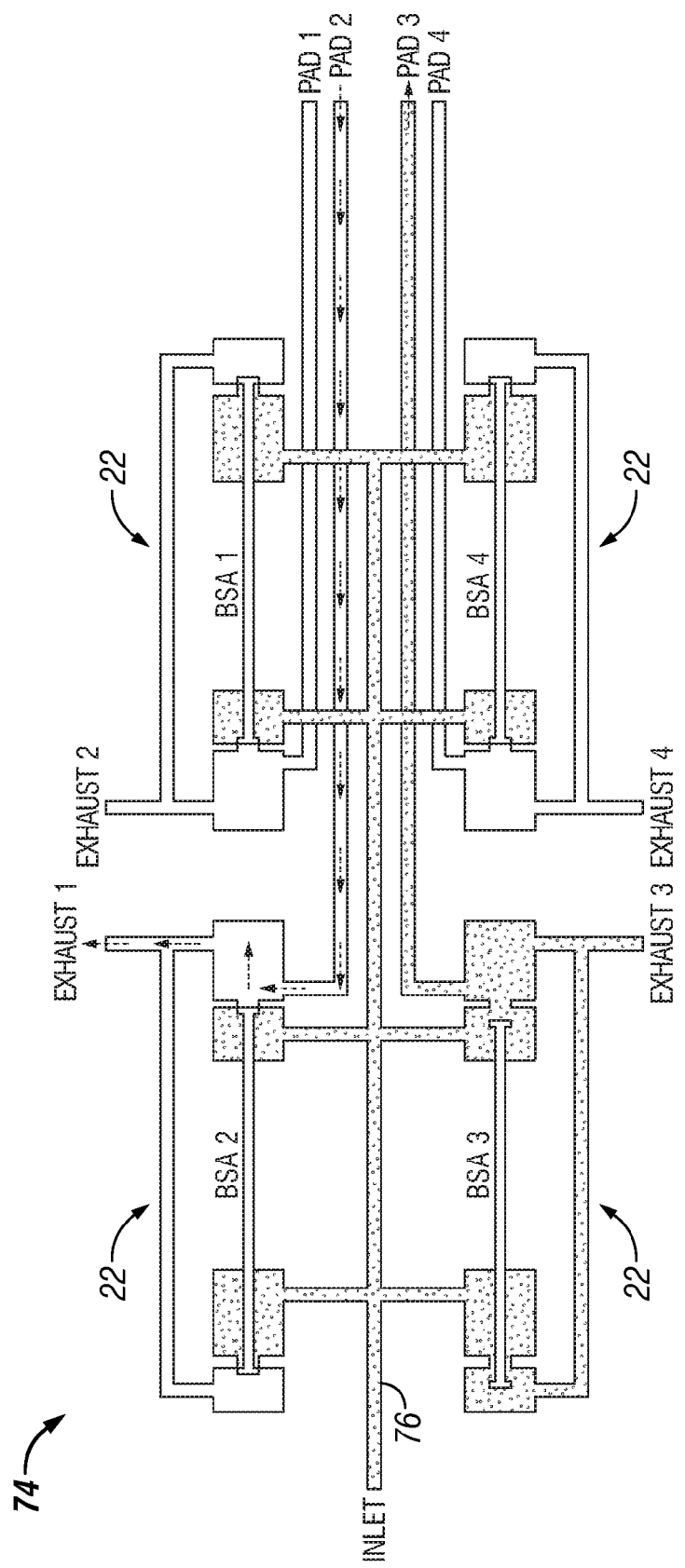
FIG. 9 is a schematic view similar to the view shown in FIG. 6, where one of the pads is being charged and another pad is being discharged.
Figure 10:
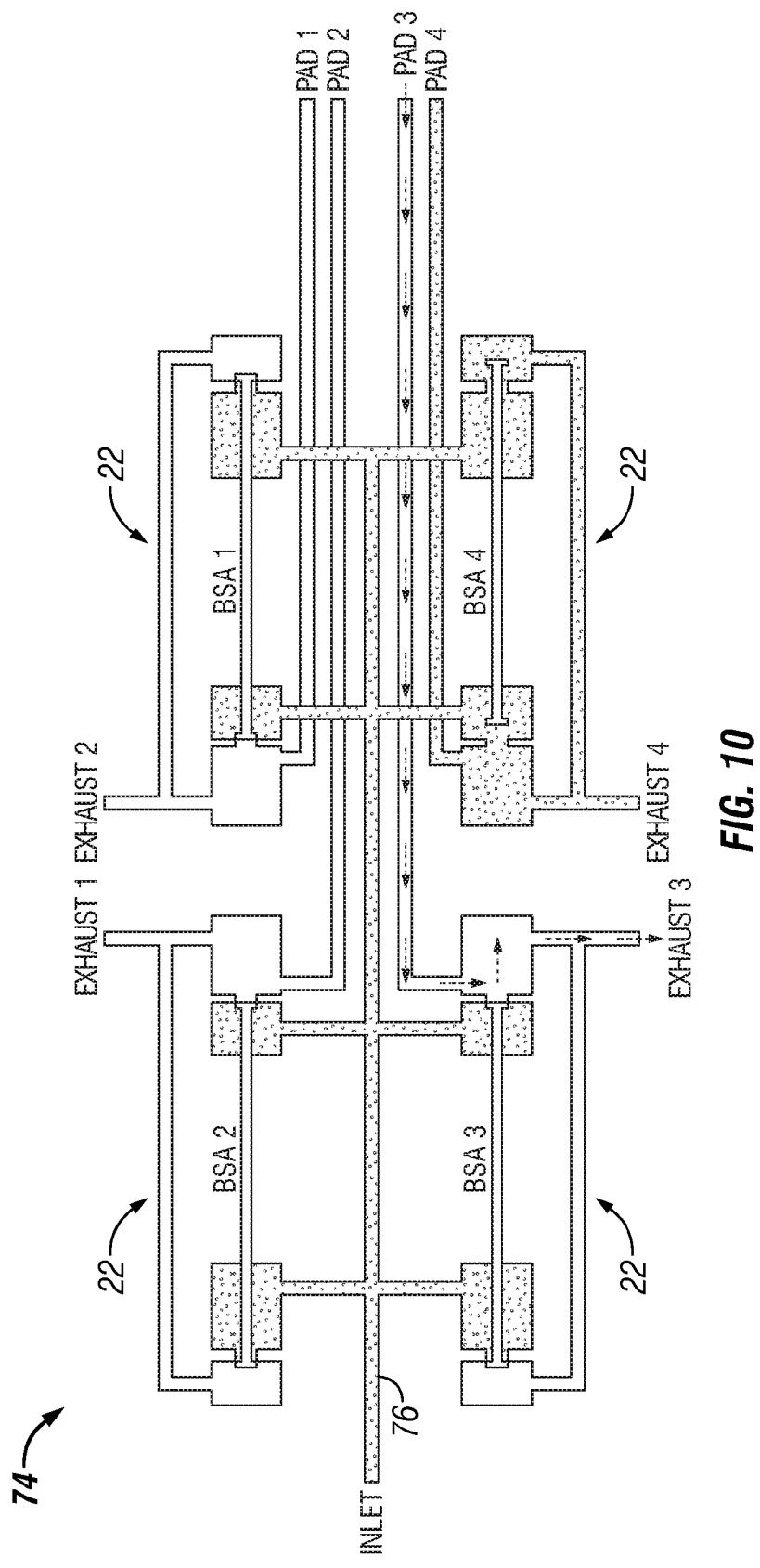
FIG. 10 is a schematic view similar to the view shown in FIG. 6, where one of the pads is being charged and another pad is being discharged.

The shaft 60 of each of the plurality of valves 22A-D is individually controllable to move between the closed position and the open position to selectively charge and discharge the plurality of pads 20. For example, FIG. 7 shows the control system 74 with one of the pads (identified as PAD 1) being charged and another pad (identified as PAD 4) being discharged. FIG. 8 shows the control system 74 with one of the pads (identified as PAD 2) being charged and another pad (identified as PAD 1) being discharged. FIG. 9 shows the control system 74 with one of the pads (identified as PAD 3) being charged and another pad (identified as PAD 2) being discharged. FIG. 10 shows the control system 74 with one of the pads (identified as PAD 4) being charged and another pad (identified as PAD 3) being discharged.

While the pressure-balanced single-staged bi-stable valve 22 has been shown in use with a four-pad rotary drilling tool, the bi-stable valve 22 can be used with any number of pads. Each pad can be separately controlled by a single valve.

The control system 74 provides for better controllability of the four-pad rotary drilling tool compared to a conventional control system that includes two bi-stable valves that control four pads. Also, the control system 74 is more reliable than conventional control systems since the failure of one of the bi-stable valves 22 does not result in the failure of the three remaining bi-stable valves 22. As a result, the rotary drilling tool does not completely lose the ability to steer. Additionally, the control system 74 results in lower backflow and higher resultant force of the bias unit compared to conventional control systems in view of the individual exhaust lines 56 of the valves 22A-D.

It will be understood that the embodiments described herein are merely exemplary and that a person skilled in the art may make many variations and modifications without departing from the spirit and scope of the invention. All such variations and modifications are intended to be included within the scope of the invention as defined by the appended claims.

What is claimed is:

1. A down hole tool control system, comprising:
a plurality of bi-stable valves, each of the valves comprising:
   a first chamber having a first aperture and a second aperture;
   a second chamber having a first aperture and a second aperture;
   a shaft having a first valve member adjacent a first end of the shaft and a second valve member adjacent an opposite second end of the shaft, the shaft movable between a first position, in which the first valve member closes off the second aperture of the first chamber and the second valve member closes off the second aperture of the second chamber to prevent fluid from passing through the second apertures of the first and second chambers, and a second position, in which the first valve member and the second valve member allow fluid to pass through the second aperture of the first chamber and the second aperture of the second chamber;
   a third chamber having a first aperture and a second aperture, the first aperture in fluid communication with the second aperture of the first chamber;
   a fourth chamber having a first aperture, a second aperture and a third aperture, the first aperture of the fourth chamber in fluid communication with the second aperture of the second chamber,
   wherein in the second position, the first chamber, the second chamber, the third chamber and the fourth chamber are fluidly coupled; and
a common inlet conduit in fluid communication with the first aperture of the first chamber and the first aperture of the second chamber of the plurality of bi-stable valves.

2. The down hole tool control system of claim 1, wherein the each valve comprises a pad conduit in fluid communication with a pad such that each bi-stable valve can operate the respective pad between an extended position and a retracted position.

3. The down hole tool control system of claim 2, wherein the pad conduit is in fluid communication with the third aperture of the fourth chamber.

4. The down hole tool control system of claim 2, wherein the each valve comprises an exhaust conduit in fluid communication with the second aperture of the third chamber and the second aperture of the fourth chamber.

5. The down hole tool control system of claim 2, wherein:
the pad conduit is in fluid communication with the third aperture of the fourth chamber; and
in the first position the pad conduit and an exhaust conduit are fluidly coupled.

6. The down hole control system of claim 1, wherein each valve comprises:
a pad conduit in fluid communication with the third aperture of the fourth chamber and in fluid communication with a pad such that each bi-stable valve can operate the respective pad between an extended position and a retracted position; and
an exhaust conduit in fluid communication with the second aperture of the third chamber and the second aperture of the fourth chamber.

7. The down hole control system of claim 6, wherein in the first position the pad conduit and the exhaust conduit are fluidly coupled.

8. A bottom hole assembly, comprising:
a bias unit connected to a drill bit, the bias unit having a plurality of pads each moveable between extended and retracted positions; and
a control unit comprising a plurality of bi-stable valves to control the operation of the bias unit, each valve comprising:
   a first chamber having a first aperture and a second aperture;
   a second chamber having a first aperture and a second aperture;
   a shaft having a first valve member adjacent a first end of the shaft and a second valve member adjacent an opposite second end of the shaft, the shaft movable between a first position, in which the first valve member closes off the second aperture of the first chamber and the second valve member closes off the second aperture of the second chamber to prevent fluid from passing through the second apertures of the first and second chambers, and a second position, in which the first valve member and the second valve member allow fluid to pass through the second aperture of the first chamber and the second aperture of the second chamber;
   a third chamber having a first aperture and a second aperture, the first aperture in fluid communication with the second aperture of the first chamber;
   a fourth chamber having a first aperture, a second aperture and a third aperture, the first aperture of the fourth chamber in fluid communication with the second aperture of the second chamber;
   an exhaust conduit in fluid communication with the second aperture of the third chamber and the second aperture of the fourth chamber; and
   a pad conduit in fluid communication with one pad of the plurality of pads.

9. The bottom hole assembly of claim 8, wherein each pad of the plurality of pads can be operated between the extended position and the retracted position separate from the control of the other pads of the plurality of pads.

10. The bottom hole assembly of claim 8, comprising a common inlet conduit in fluid communication with the first aperture of the first chamber and the first aperture of the second chamber of the plurality of bi-stable valves.

11. The bottom hole assembly of claim 8, wherein:
the pad conduit is in fluid communication with the third aperture of the fourth chamber; and
in the first position the pad conduit and the exhaust conduit are fluidly coupled.

12. The bottom hole assembly of claim 8, wherein:
the pad conduit is in fluid communication with the third aperture of the fourth chamber; and
in the second position, the first chamber, the second chamber, the third chamber and the fourth chamber are fluidly coupled.

13. A bottom hole assembly, comprising:
a bias unit connected to a drill bit, the bias unit having a plurality of pads each moveable between extended and retracted positions; and
a control unit comprising a plurality of bi-stable valves to control the operation of the bias unit, each valve comprising:
   a first chamber having a first aperture and a second aperture;
   a second chamber having a first aperture and a second aperture;

a shaft having a first valve member adjacent a first end of the shaft and a second valve member adjacent an opposite second end of the shaft, the shaft movable between a first position, in which the first valve member closes off the second aperture of the first chamber and the second valve member closes off the second aperture of the second chamber to prevent fluid from passing through the second apertures of the first and second chambers, and a second position, in which the first valve member and the second valve member allow fluid to pass through the second aperture of the first chamber and the second aperture of the second chamber;

a third chamber having a first aperture and a second aperture, the first aperture in fluid communication with the second aperture of the first chamber;

a fourth chamber having a first aperture, a second aperture and a third aperture, the first aperture of the fourth chamber in fluid communication with the second aperture of the second chamber; and a pad conduit in fluid communication with the third aperture of the fourth chamber and in fluid communication with one pad of the plurality of pads, wherein in the second position, the first chamber, the second chamber, the third chamber and the fourth chamber are fluidly coupled.

14. The bottom hole assembly of claim 13, wherein each pad of the plurality of pads can be operated between the extended position and the retracted position separate from the control of the other pads of the plurality of pads.

15. The bottom hole assembly of claim 14, an exhaust conduit in fluid communication with the second aperture of the third chamber and the second aperture of the fourth chamber.

16. The bottom hole assembly of claim 13, comprising a common inlet conduit in fluid communication with the first aperture of the first chamber and the first aperture of the second chamber of the plurality of bi-stable valves.

17. The bottom hole assembly of claim 13, comprising:
a common inlet conduit in fluid communication with the first aperture of the first chamber and the first aperture of the second chamber of the plurality of bi-stable valves; and
an exhaust conduit in fluid communication with the second aperture of the third chamber and the second aperture of the fourth chamber.

18. The bottom hole assembly of claim 17, wherein each pad of the plurality of pads can be operated between the extended position and the retracted position separate from the control of the other pads of the plurality of pads.

* * * * *